United States Patent [19]

James et al.

[11] Patent Number: 4,484,937
[45] Date of Patent: Nov. 27, 1984

[54] DUST FILTER APPARATUS

[75] Inventors: Granville C. James; Gerald K. Burnard, both of Ashby-de-la-Zouch, England

[73] Assignee: Coal Industry (Patents) Limited, London, England

[21] Appl. No.: 363,685

[22] Filed: Mar. 30, 1982

[30] Foreign Application Priority Data

May 29, 1981 [GB] United Kingdom ............... 8116434

[51] Int. Cl.³ ............................................. B01D 47/12
[52] U.S. Cl. ........................................ 55/223; 55/228; 55/229; 55/257 R
[58] Field of Search ................. 55/223, 233, 238, 228, 55/229, 257 R

[56] References Cited

U.S. PATENT DOCUMENTS

| | | | |
|---|---|---|---|
| 2,523,441 | 9/1950 | McKamy | 55/223 |
| 2,935,375 | 5/1960 | Boucher | 55/233 X |
| 3,299,619 | 1/1967 | Terry | 55/228 X |
| 3,345,046 | 10/1967 | Versluys et al. | 55/238 X |
| 3,409,409 | 11/1968 | Sackett, Sr. | 55/233 X |
| 3,505,788 | 4/1970 | Teller et al. | 55/233 |
| 3,722,839 | 3/1973 | Erickson et al. | 55/238 X |
| 3,753,337 | 8/1973 | Shaw et al. | 55/233 |
| 3,795,089 | 3/1974 | Reither | 55/233 X |
| 4,175,933 | 11/1979 | James | 55/233 X |
| 4,253,854 | 3/1981 | James | 55/233 X |

FOREIGN PATENT DOCUMENTS

| | | | |
|---|---|---|---|
| 2516767 | 10/1976 | Fed. Rep. of Germany | 55/238 |
| 727704 | 4/1955 | United Kingdom | 55/238 |
| 959580 | 6/1964 | United Kingdom . | |
| 1024208 | 3/1966 | United Kingdom . | |
| 1416478 | 12/1975 | United Kingdom . | |
| 1454846 | 11/1976 | United Kingdom . | |
| 2006046 | 5/1979 | United Kingdom . | |
| 2014470 | 8/1979 | United Kingdom . | |
| 2046624 | 11/1980 | United Kingdom . | |
| 2057911 | 4/1981 | United Kingdom | 55/233 |
| 322208 | 2/1972 | U.S.S.R. | 55/238 |

Primary Examiner—Kathleen J. Prunner
Attorney, Agent, or Firm—James C. Wray

[57] ABSTRACT

Dust filter apparatus comprises a first, coarse dust removal stage constituted by a plurality of swirl chamber devices into which a liquid is sprayed and a second, fine dust removal stage constituted by a wetted filter panel.

1 Claim, 3 Drawing Figures

DUST FILTER APPARATUS

This invention relates to dust filter apparatus.

In particular, although not exclusively, the present invention relates to dust filter apparatus for use in underground mines where it is known to induce an air flow away from a dust generating source, for example, a rock cutting head or a conveyor discharge station and to pass the induced air flow through the dust filter apparatus to remove particles of dust from the air.

Examples of prior known dust filter apparatus suitable for use in underground mines are disclosed in British Patent Specifications Nos. 1,412,299 and 1,544,462. Although these prior known filter apparatus are efficient for suppressing dust they suffer from the disadvantage that they are incapable of handling heavy dust concentrations as frequently as encountered in some mining installations.

An object of the present invention is to provide dust filter apparatus which tends to overcome or reduce the above mentioned problem.

According to the present invention dust filter apparatus comprises a gaseous flow duct, a filter panel arranged across the duct, a swirl chamber device mounted in the duct upstream of the filter panel, nozzle means for spraying liquid into the gaseous flow duct upstream of the filter panel, and liquid collection means arranged to collect liquid draining from the duct.

Preferably, a plurality of swirl chamber devices are arranged in parallel.

Conveniently, the nozzle means comprises a plurality of sprays.

Preferably, at least some of the sprays are mounted downstream of the swirl chamber devices.

Preferably, the or each swirl chamber device comprises a generally cylindrical outer casing and a gaseous flow guide for inducing the gaseous flow to swirl within the outer casing.

Conveniently, the guide is stationary.

Advantageously, the liquid collection means provides collection apertures associated with the outer casing of the or each swirl chamber device.

Preferably, the liquid collection means provides collection apertures for collecting liquid flowing down the filter panel.

Advantageously, means are provided for inducing a gaseous flow along the duct.

By way of example only, one embodiment of the present invention now will be described with reference to the accompanying drawings, in which.

Figure 1:
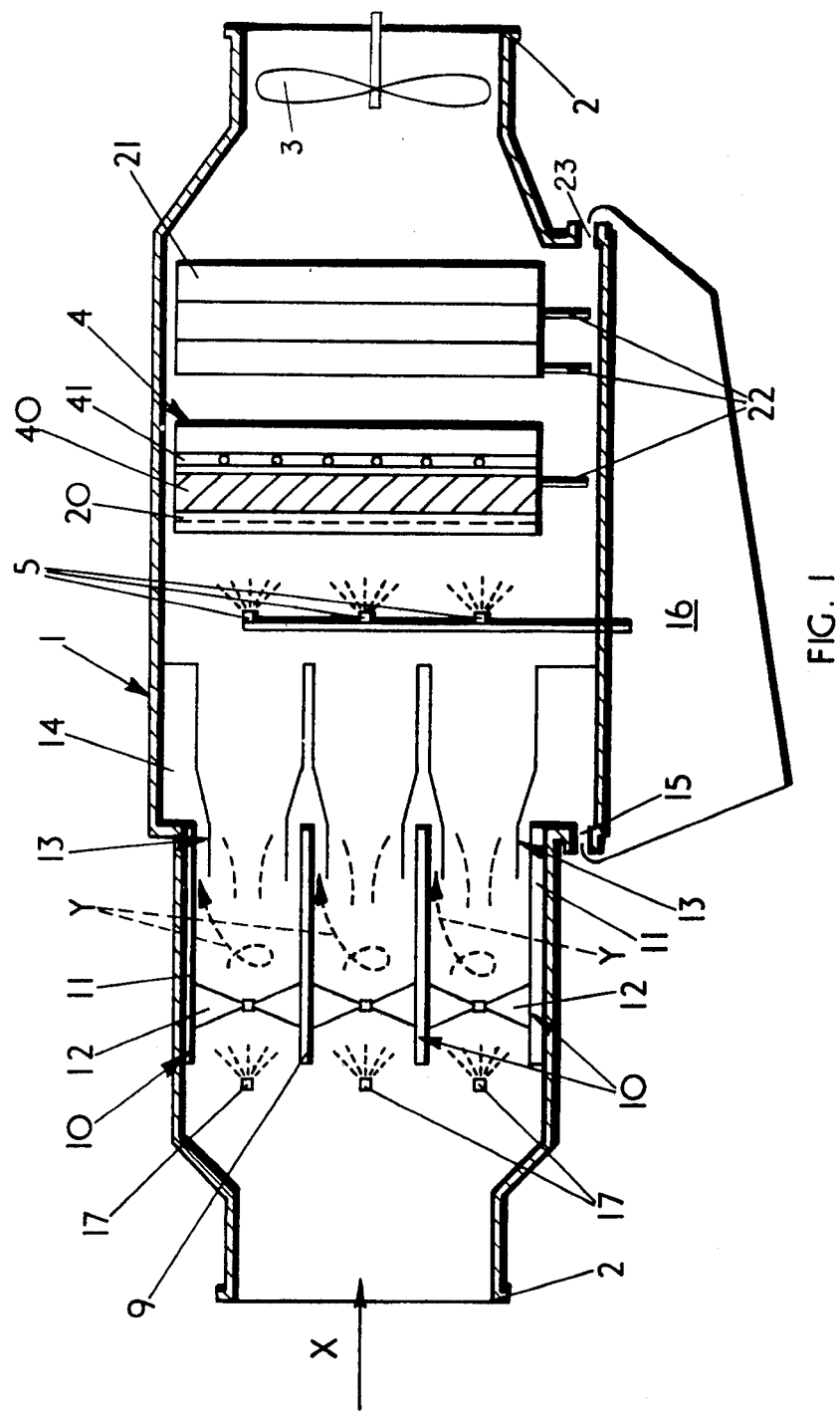
FIG. 1 is a diagrammatic longitudinal section taken through dust filter apparatus constructed in accordance with the present invention.
Figure 2:
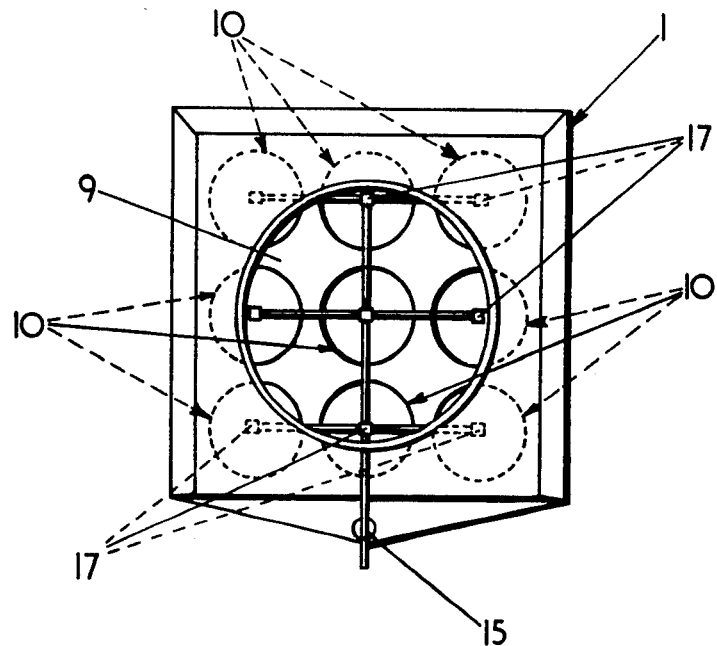
FIG. 2 is a diagrammatic end view of the apparatus of FIG. 1.

FIGS. 1 and 2 show one embodiment of dust filter apparatus constructed in accordance with the present invention to comprise a gaseous flow duct 1 along which gas is induced to flow in the direction indicated by arrow X. Typically, in an underground mine installation the gas is ventilation air extracted from a zone of heavy dust concentration. The flow of air along the duct 1 is induced by a fan 3 which may be mounted upstream or downstream of the dust filter application. The ends of the ducting 1 have flanges 2 for enabling ducting sections to be connected to the dust filter apparatus.

A filter panel 4 is mounted across the full width of the duct 1 with a bank of liquid sprays 5 arranged to direct liquid, typically water, onto the upstream facing margin of the filter panel. The panel comprises a fibrous mat filter having a fibre density such that the mat filter retains substantially no liquid by capillary action and permits flow of liquid throughout the thickness of the filter in the directions parallel to and transverse to, the direction of gaseous flow and having a loft or thickness such that in use the liquid from the sprays 5 saturates the whole of the mat filter. The arrangement is such that, in use, a continuous body of flowing liquid is formed coincident with the mat filter across the gaseous flow duct and having a thickness substantially equal to the thickness of the mat filter.

Alternatively, the dust filter panel comprises a plurality of filter layers extending across the cross-sectional area of the duct, at least alternate filter layers defining at least portions of passageways for liquid flowing down the filter panel between two adjacent filter layers. Repetitive, alternate filter layers comprise fine and coarse sheets fabricated of wire, respectively, the flow of liquid in the panel tending to be restrained by the filter layers comprising the fine sheets such that, in use, a liquid curtain is formed across the cross-sectional area of the duct. Each filter layer is crimped to define the portions of the passageways and typically the sheets comprise knitted stainless steel wire.

The dust filter apparatus also comprises a plurality of swirl chamber devices 10 arranged in parallel across the duct 1 (see FIGS. 1 and 2) and supported by a blanking plate 9. Each device 10 comprises a generally cylindrical outer casing 11 and a stationary gaseous flow guide 12 for inducing the gaseous flow along the device to swirl as indicated by arrow y in FIG. 1. Each device 10 is provided with liquid collection means constituted by apertures 13 associated with the downstream portion of the outer casing and leading to an intermediate collection chamber 14. From the chamber 14 the liquid flows via channel 15 into a tank 16.

Each swirl chamber device 10 is provided with a spray 17 for directing liquid, typically water into the mouth of the associated outer casing.

The filter panel 4 which is removable from the duct comprises a protective screen 20 arranged across the duct upstream of an filter element 40 to prevent relatively large particles of dust material from reaching the element. A rigid backing support 41 is provided in the filter panel to maintain the element in position across the duct. In addition a liquid eliminator arrangement 21 is provided downstream of the filter panel in order to reduce the amount of liquid carried beyond the filter apparatus to an acceptable amount.

Baffle plates 22 are provided below the filter panel and liquid eliminator arrangement to prevent a short circuit of the gaseous flow and to allow liquid to drain without re-entrainment by the air stream collection apertures 23 collect liquid flowing down the filter panel.

Figure 3:
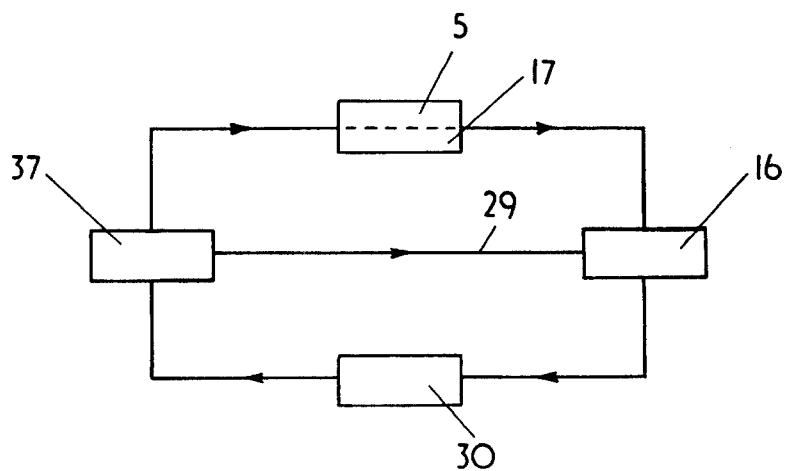
FIG. 3 is a circuit flow diagram for dust suppression liquid sprayed into the apparatus of FIG. 1.

FIG. 3 shows the circuit flow diagram for the liquid sprayed from the sprays 5 and 17. Relatively dirty water is drawn from the aforementioned tank 16 by the action of a pump 30 which feeds the water to a hydrocyclone device 37. The hydrocyclone device 37 separates the majority of dust particles from the water and returns the dirty water back to tank 16 along line 29. The treated relatively clean or dust free water is fed to the spray banks 5 or 17. As discussed previously the water from the sprays 5 flows down the filter panel into the tank 16 or is collected by the liquid eliminator arrangement 21 and thereby fed to the tank 16. Water from the sprays 17 is collected via apertures 13 and fed back to tank 16. Thus, the liquid supply tends to be self contained with the liquid continuously recirculated. After extended use the tank is emptied and the tank bottom scoured by liquid sprays to remove all the dust particles settled on the bottom of the tank. The tank then is filled with clear water and the dust filtering action restarted.

In use, mine air containing a heavy concentration of dust is induced to flow along the gaseous flow duct 1 of the dust filter apparatus. Upon entering the filter apparatus the dust carrying air is wetted by water from the sprays 17, the wetted air flowing into the swirl chamber devices 10 where the action of the guides 12 is to induce the air flow to swirl as indicated by arrows y. The effect of the swirl flow is to urge the relatively heavy dust particles carried by the air flow to move radially outwards towards the associated outer casing 11. Thus, by the time the swirling air flow reaches the apertures 13 the relatively coarse heavy dust particles enter the apertures 13 together with a substantial amount of the liquid from the sprays 17 and are washed into the tank 16 as previously explained. Water is used in the swirl chambers to prevent dust particles bouncing off the chamber wall back into the air stream, the wet walls tending to retain the particles. Also the use of water tends to flush the collected dust particles away and thereby preventing build up of collected particles.

By the time the air leaves the swirl chamber devices 10 substantially all the relatively coarse heavy dust particles have been removed. Thus the air treated on the filter panel 4 substantially is carrying only relatively fine, light dust particles which are accepted and treated by the filter panel without giving rise to problems as for example, blinding of the filter panel.

The fine particles and a relatively large portion of the water from the sprays 5 are collected by the filter panel 4 and flow down the panel into the tank 16.

The moisture content of the air leaving the filter apparatus is reduced to an acceptable level by the action of the liquid eliminator arrangement 21.

From the above description it will be appreciated that the present invention provides dust filter apparatus suitable for use with heavy dust concentrations, the apparatus comprising a first stage for the removal of relatively coarse dust particles and a second stage for the removal of relative fine dust.

In modified arrangements at least some of the sprays are directed upstream against the direction of air flow.

We claim:

1. Dust filter apparatus for use in underground mines comprising a generally horizontal duct having flanges at opposite ends thereof for connecting to ducting sections, a filter panel vertically mounted across a full width of the duct, the filter panel comprising a filter means for promoting air flow and liquid flow through the filter and downward along the filter, a vertical bank of liquid spraying means for spraying liquid onto an upstream face of the filter panel, liquid eliminator means vertically arranged in the duct downstream of the filter panel for reducing liquid carried beyond the filter panel, baffle plate means disposed below the filter panel and liquid eliminator means for preventing short-circuit of gaseous flow and allowing liquid to drain without re-entrainment by an air stream in the duct, a liquid collection tank mounted beneath the duct and beneath the filter panel and liquid eliminator means for receiving liquid from the liquid eliminator means and filter panel, plural swirl chamber means arranged in parallel across the duct for removing relatively heavy dust particles carried by air flowing through the duct, each swirl chamber means comprising a cylindrical casing, a swirl inducing means mounted across the casing and a spray means mounted upstream of the swirl inducing means for spraying liquid into air flowing through the casing and past the swirl inducing means for washing relatively heavy dust particles along the casing and an aperture around a downstream end of the casing for receiving coarse heavy dust particles and liquid from the casing and means for communicating the aperture with the tank for directing the coarse heavy dust particles and liquid from the swirl chamber casing to the tank, a pump connected to the tank for drawing liquid from the tank, a hydrocyclone separator connected to the pump for separating dust particles from liquid and connected to the tank for returning dirty water with dust particles to the tank and means connecting the hydrocyclone to the bank of liquid spraying means and to the spraying means in the swirl chamber means.

* * * * *